Dec. 12, 1967  H. M. GROSS  3,357,398
METHOD AND APPARATUS FOR COATING TABLETS
Filed Sept. 28, 1962  3 Sheets-Sheet 1
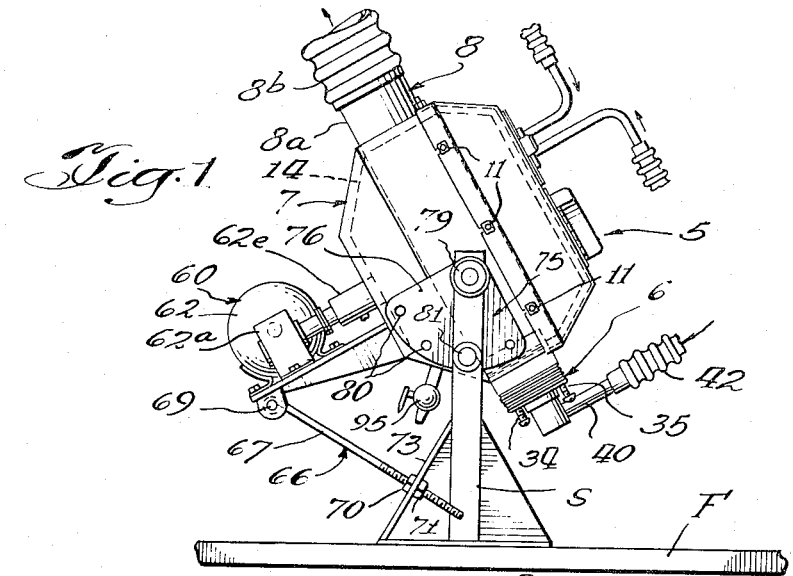
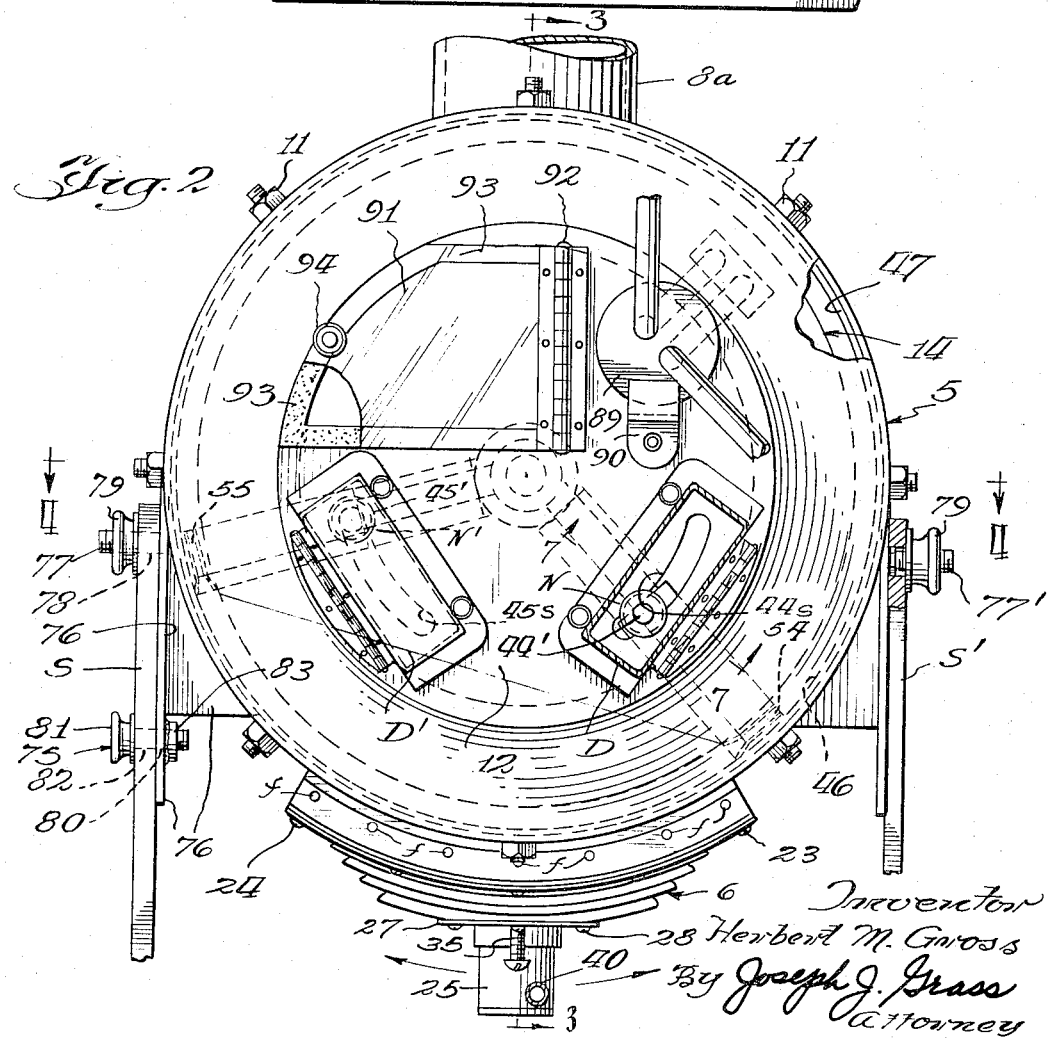
Inventor
Herbert M. Gross
By Joseph J. Gross
Attorney

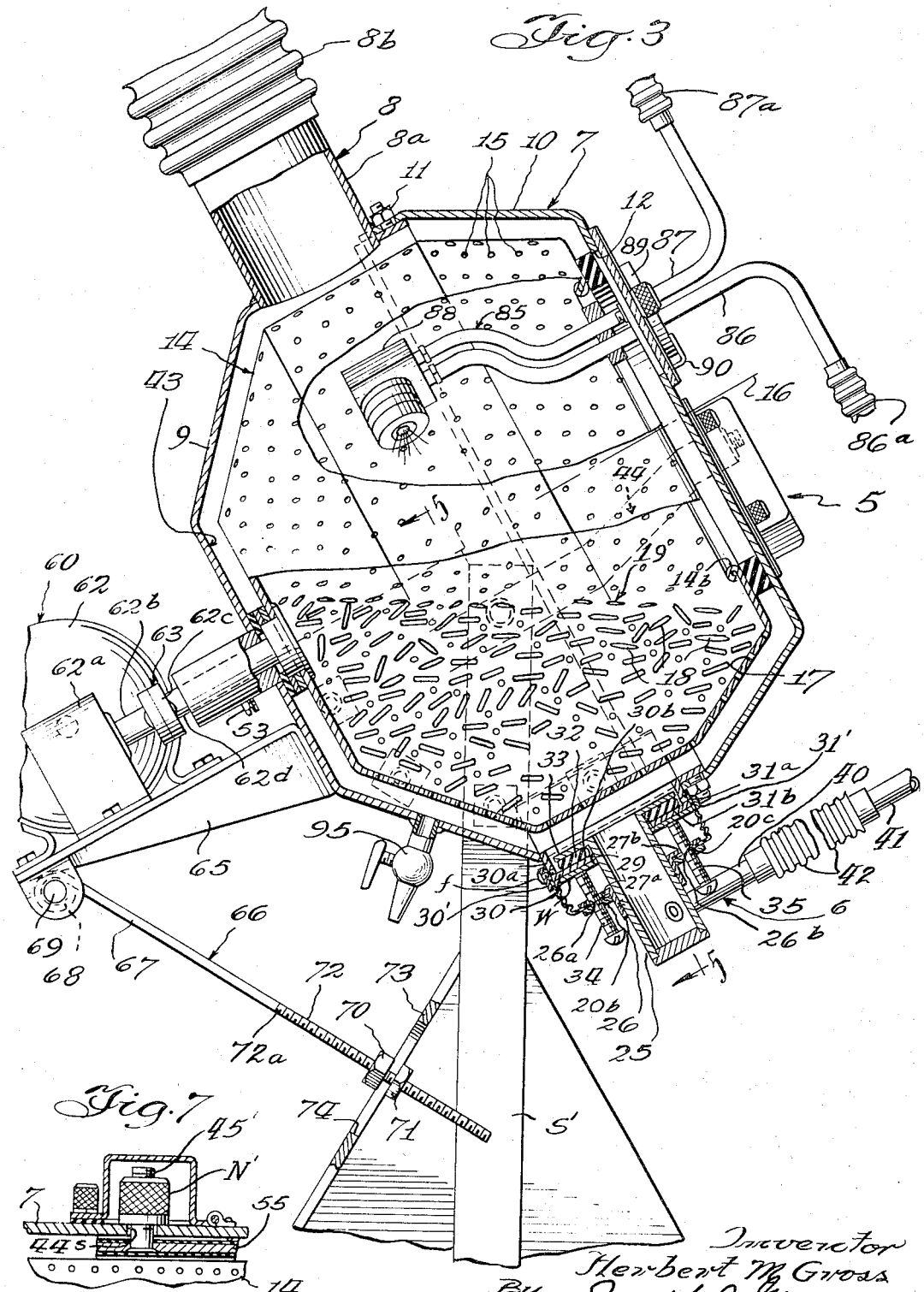

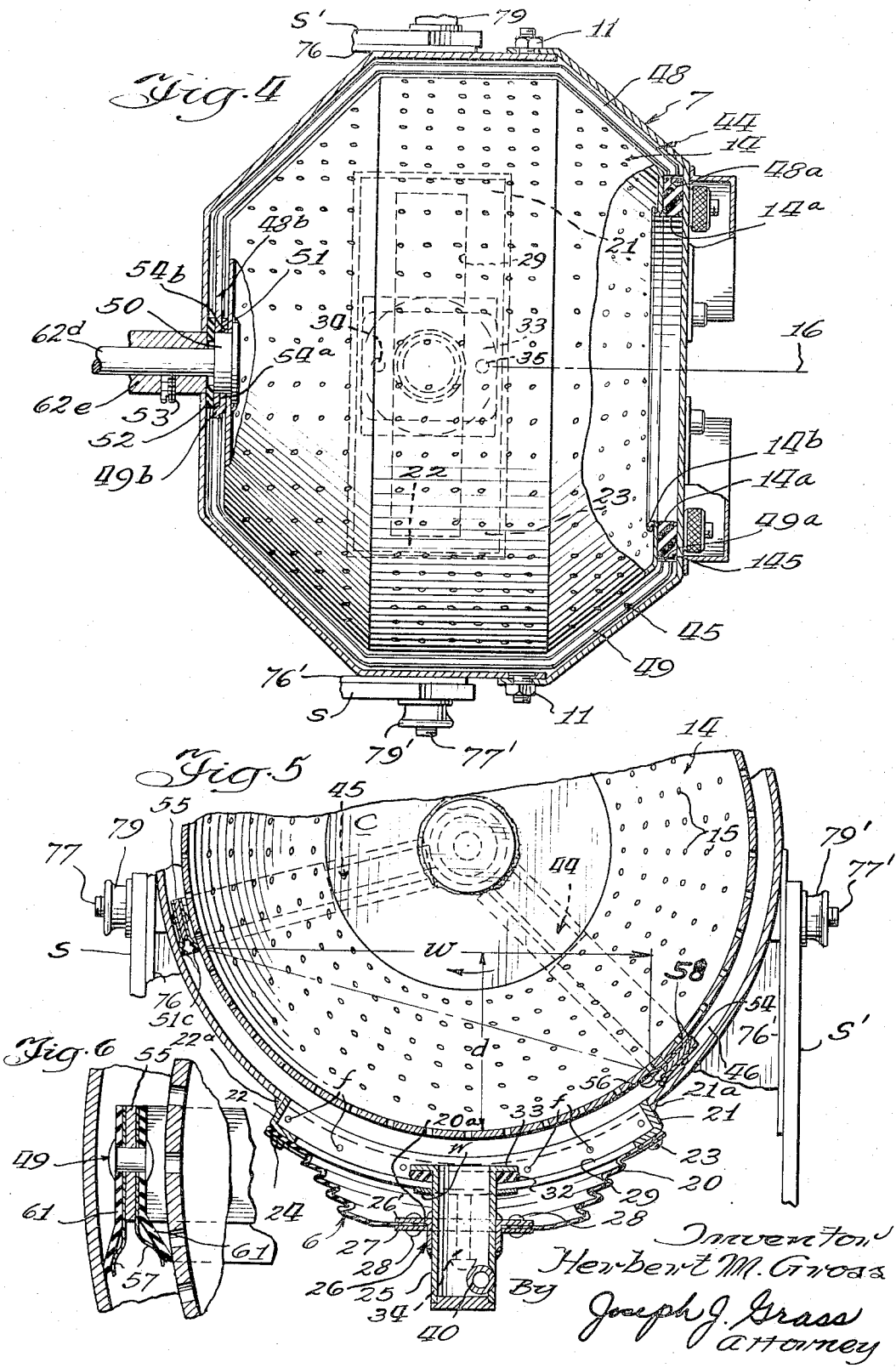

United States Patent Office 3,357,398
Patented Dec. 12, 1967

3,357,398
METHOD AND APPARATUS FOR
COATING TABLETS
Herbert M. Gross, Waukegan, Ill., assignor to Abbott Laboratories, North Chicago, Ill., a corporation of Illinois
Filed Sept. 28, 1962, Ser. No. 226,879
6 Claims. (Cl. 118—418)

This invention relates to a method of and an apparatus for coating tablets. The term "tablets" as employed in this application refers to pharmaceutical tablets. However, it will be readily apparent to one skilled in the art that other types of articles such as candies and other edibles are adapted to be coated by practicing the method and by employing the apparatus of the invention.

Tablet coating apparatus previously and universally employed utilized an imperforate rotatable coating pan. The advantages of use are: large volume production, very low attrition, good coating distribution, and smoothening and polishing of the tablets which imparts desirable pharmaceutical elegance thereto. These advantages are related to the rolling and tumbling of one tablet over another as the pan rotates. The time required to apply a coating by such apparatus is variable, running as long as three to six days with a conventional sugar coating medium and as short as two to four hours with the newer types of coating media.

The technology involved in the tablet coating art had advanced rapidly in recent years. The status of polymer chemistry and compounds capable of producing highly desirable coatings had advanced even more rapidly. There exist today a number of coating media which include plastic polymeric materials exhibiting highly desirable physical and chemical properties, one example being a coating medium containing hydroxypropyl methyl cellulose disclosed in co-pending United States patent application Ser. No. 126,425, filed July 10, 1961. The properties include: rapid water solubility of advantage therapeutically, solubility in organic solvents for coating purposes, resistance to moisture, comparative inertness both chemically and physically, freedom from toxicity and freedom from color, odor and taste. Some of these coating media, and in particular the one containing hydroxypropyl methyl cellulose, cannot be successfully applied to tablets on a production basis when a conventional pan coating apparatus is employed, even though a drying medium such as air is passed into contact with the surface layer of the bed of tablets. Therefore, it is readily apparent that there exists today coating media, having highly desirable properties, which until the present invention could not be successfully applied on a production basis using conventional pan coating apparatus. These coating media, when applied from a suitable organic solvent system, must be added to the bed of tablets in sufficient concentration to obtain adequate coverage of the tablets to assure efficient and optimal coating. If this type of coating medium is applied in adequate amounts in conventional pan coating apparatus not only is the coating time long but the resulting tablets have rough finishes. If the coating medium is applied too rapidly, there is a tendency to dissolve an earlier coating and a "washing effect" occurs. This also results in an uneven, rough and powdery coating which is entirely unacceptable in the art. Although the method and apparatus of the invention are of a character to enable this type of coating medium to be applied, the method and apparatus of the invention are also quite useful in applying well known media which include for example sugar coatings.

In the prior art there are found air suspension coating systems wherein the tablets are suspended in an upwardly moving stream of air and a coating medium is dispensed onto the suspended bed of tablets. In such systems the required drying time is short because a tremendous amount of drying medium, normally air, is employed. A major problem with such air suspension systems is the tablet attrition which results from the extremely rough treatment of the tablets in the air stream. This results in very limited usage for an air suspension system since it can only be used with tablets having a low attrition susceptibility.

It is, accordingly, one of the purposes of the invention to provide a coating method and apparatus which possess the advantages of low attrition and polishing and smoothening of the tablets as realized in an apparatus having a conventional rotatable coating pan and the highly desirable short drying time as realized in an air suspension coating system.

It is also one of the features of the invention to provide a coating method and apparatus whereby the coating medium is applied to the tablets evenly and effectively while they are being rolled upon each other, the time required to dry the coating medium on the individual tablets being quite short.

It is another feature of the invention to provide a coating method and apparatus whereby the drying medium is efficiently distributed through the bed of tablets while the tablets roll upon each other with a resulting smoothening and polishing of the tablets.

It is a feature of the invention to provide a coating apparatus wherein a drive mechanism, a housing and a rotatable coating pan are adjustable as a unit with respect to the vertical.

It is another feature of the invention to provide a method and apparatus whereby the flow path of the drying medium which is introduced through the bed of tablets is adjustable to accommodate for variations in depth and width of the bed of tablets.

It is another feature of the invention to provide a drying medium inlet which is adjustable along a plane generally perpendicular to the axis of rotation of the coating pan.

In the diagrammatic, illustrative drawings:

FIGURE 1 is a side elevational view of the coating apparatus of the invention;

FIGURE 2 is a front elevational view of the coating apparatus of the invention;

FIGURE 3 is a cross-sectional view taken along line 3—3 of FIGURE 2 of the illustrative drawings;

FIGURE 4 is a cross-sectional view taken along line 4—4 of FIGURE 2 of the illustrative drawings;

FIGURE 5 is a cross-sectional view taken along line 5—5 of FIGURE 3 of the illustrative drawings;

FIGURE 6 is an enlarged cross-sectional view showing one of the seals employed in the coating apparatus of the invention; and FIGURE 7 is a cross-sectional view taken along line 7—7 of FIGURE 2 of the illustrative drawings.

Referring now to the illustrative drawings, there is shown a coating apparatus generally indicated at 5. The coating apparatus 5 is provided with a drying medium inlet generally indicated at 6 which leads into a housing 7 and an outlet generally indicated at 8 which leads from the housing 7. The housing 7, which defines a chamber C, is shown to have a back portion 9 and a front portion 10 which is removably secured thereto by fasteners 11. The front portion P has an opening 12. The housing 7 is shown to be pivotally mounted on standards S and S'. The standards S and S' are supported by a floor F. The outlet 8 is shown to include an outlet duct 8a welded to the housing 7 and a flexible outlet duct 8b through which the spent drying medium passes to the outside for example. A rotatably mounted coating pan or drum generally indicated at 14 having a plurality of perforations 15 and spaced inwardly from the housing 7 is mounted for rotation about an axis of rotation 16. The perforations 15 are substantially smaller than the tablets 18 to be coated so that the tablets 18 will not fall therethrough and so that no sharp edge will be able to present itself to nip the tablets 18 as they contact the coating pan 14. The coating pan 14 has a smooth, highly polished inner surface 17 which obviates attrition. The smooth inner surface 17 is necessary in the event the tablets 18 are brittle and hence susceptible to attrition.

The inlet 6 includes a seal 20, composed for example of a sheet of rubber, as best shown in FIGURES 3 and 5 of the illustrative drawings. A pair of spaced angle members 21 and 22 are secured by weldments indicated at 21a and 22a to the lower portion of the housing 7. Threaded fasteners 23 and 24 hold each end of the seal 20 in airtight engagement with the angle members 21 and 22. The inlet 6 also includes the inlet duct 25. The duct 25, received in an opening 20a in the seal 20, has welded thereto annular angle member 26. The portion of the seal 20 around the opening 20a is sandwiched between annular washer 27 and an arm 26' of the annular angle member 26 and held in air-tight relationship by a plurality of spaced threaded fasteners 28. The inlet duct 25 is adjustable by moving it in a plane generally perpendicular to the axis of rotation 16 of the coating pan 14 along an elongated arcuate slot 29. The elongated sides of the slot 29 are defined by elongated arcuate angle members 30 and 31. Arcuate washer bars 30', under the action of fasteners $f$, hold the sides of the seal 20 against arm portion 30a and 31a of the angle members 30 and 31, respectively. An annular resilient washer 32, composed for example of rubber, is disposed between an external annular flange 33 on the inlet duct 25 and opposed arms 30b and 31b of the angle members 30 and 31, respectively, A pair of opposed threaded fasteners 34 and 35 are received in tapped holes 26a and 26b in the annular angle member 26. The threaded fasteners 34 and 35 pass through apertures 20b and 20c in the seal 20 and through apertures 27a and 27b in the washer 27.

In order to adjust the duct 25 to its desired position along the housing 7, the threaded fasteners 34 and 35 are first loosened and the duct 25 is manually slid along the arcuate elongated slot 29 to the desired position. The threaded fasteners 34 and 35 are then tightened so that their terminal ends apply a force to an annular wear plate W which lies against arm portions 30b and 31b of the angle members 30 and 31, respectively, to compress the resilient washer 32.

The inlet 6 also includes a small duct 40 which leads into the lower end of the enlarged inlet duct 25. A duct 41 leads to a suitable source of drying medium under pressure. A flexible duct 42 connects the ducts 40 and 41.

The space between the housing 7 and the coating pan 14 defines a manifold generally indicated at 43 into which the drying medium passes from the linet 6. The drying medium passes into the manifold 43, through the perforations 15 and through the bed 19 composed of a plurality of tablets 18. In order to control the flow path of the drying medium, a pair of spaced dividers generally indicated at 44 and 45 are preferably provided. The dividers 44 and 45 divide the manifold 43 into an inlet manifold 46 and an outlet manifold 47. The dividers 44 and 45 confine the path of drying medium flow to entirely below the bed 19 so that the drying medium must pass through the entire bed 19 of tablets 18. The dividers 44 and 45 are shown to take to form of adjustable seals 48 and 49 which extend from the housing 7 to the coating pan 14. It is readily apparent that the manifold 43 can be divided by other than the specific seals 48 and 49, for example by an inwardly extending plate (not shown) which is secured to the housing 7 and which extends inwardly just short of the coating pan 14 along its extent. The seal 48 terminates at one end 48a at a continuous annular seal 14a which is suitably secured for example by an adhesive to the coating pan 14. The seal 14a is shown to terminate at an opening 14b in the coating pan 14. An opposite end 48b of the seal 48 terminates at a bearing 50. The bearing 50 is secured to the coating pan by a weldment 51. The seal 49 terminates at one end 49a at the annular seal 14a and an opposite end 49b of the seal 49 terminates at the bearing 50. The bearing 50 is formed integrally with a drive shaft 62d of a drive mechanism 60 later to be described. A washer bearing 52 is disposed between the bearing 50 and a sleeve 62e on the shaft 62d. The sleeve 62e is brought into adjustment relative to the bearing 50 by a set screw 53.

As best shown in FIGURES 5 and 6 of the illustrative drawings, the seal 48 and the seal 49 include supporting members 54 and 55, respectively. Terminal ends 54a and 55a of the supporting members 54 and 55 encircle and are in air-tight engagement with the bearing 50. A leaf spring 56 lies against each side of the supporting member 54, while a leaf spring 57 lies against each side of the supporting member 55 throughout the entire length thereof. A pair of opposed strips 58 of a sealing material such as a copolymer of tetrafluoroethylene and hexafluoropropylene, known commercially as Teflon, are urged by the leaf springs 56 against the inside of the housing 7 and the outside of the coating pan 14. Only enough pressure is exerted by the leaf springs 56 so that an effective seal is achieved and wear between the resilient strips 58 and the coating pan 14 is minimum in character. Likewise, a pair of strips 61, composed of the same material as strips 58, are urged by the leaf springs 57 against the housing 7 and the outside of the coating pan 14. The annular seal 14a is preferably composed of the same material as strips 58 and 61.

Since the depth $d$ and width $w$ of the bed 19 varies as to the speed of rotation of the coating pan 14, the weight, size and number of tablets 18, and as the internal configuration and dimensions of the coating pan 14, it is sometimes desirable to adjust the location of one or both of the dividers 44 and 45 along the housing 7 for example to the position shown in FIGURE 5 of the illustrative drawings so that the flow path of the drying medium is confined to those perforations in the coating pan 14 which the bed 19 of tablets 18 covers. In a word, the flow path of the drying medium is able to be adjusted so that all the drying medium will be caused to pass through the bed 19 of tablets 18. In the event the dividers 44 and 45 are not so disposed that all the drying medium will flow through the bed 19 of tablets 18, the dividers 44 and 45 are adjusted by loosening nuts N and N', shifting studs 44' and 45' along arcuate elongated slots 44s and 45s in the cover plate 12 to the desired location and then tightening the nuts N and N'. Doors D and D' hingedly mounted on the cover plate 12 prevent the drying medium from escaping through the slots 44s and 45s.

In order to drive the rotatably mounted coating pan 14 there is shown to be provided a drive mechanism generally indicated at 60 which includes a variable speed electric motor 62, a speed reducer 62a to which the motor 62 is connected, a drive shaft 62b and a coupling 62c connecting the drive shaft 62b and a drive shaft 62d. The drive shafts 62b and 62d and the coupling 62c comprise a drive connection generally indicated at 63. The motor 62 and the speed reducer 62a are mounted on a bracket 65 which is secured by welding to the housing 7.

In order to adjust the vertical inclination of the housing 7, the coating pan 14 and the drive mechanism 60 as a unit, there is provided an adjusting mechanism generally indicated at 66. The adjusting mechanism 66 includes a rod 67, one end 68 of which is pivotaly connected to a pin 69 which is secured to the bracket 65. When it is desired to change the angular inclination of the housing 7, the coating pan 14 and the drive mechanism 60 as a unit with respect to the vertical, an opposed pair of threaded fasteners 70 and 71, which are threadably received by a threaded portion 72 of the rod 67, are adjusted along the threaded portion 72. The threaded fasteners 70 and 71 straddle a bracket 73 which is secured to the standard S. The bracket 73 is provided with an elongated slot 74 which enables the rod 67 to extend perpendicularly to the bracket 73 so that the full undersides of the fasteners 70 and 71 will always bear against the bracket 73.

In the event it is desired to position the housing 7 and the coating pan 14 roughly, the more precise adjusting mechanism 66 can be rendered inoperative by threading the threaded fastener 70 to the end 72a of the threaded portion 72 and by unthreading the fastener 71. An adjusting mechanism 75 is then employable. The adjusting mechanism 75 includes a bracket 76 which is secured to the housing 7, for example by welding. A threaded stud 77 extends outwardly from the bracket 76 and passes through an aperture 78 in the standard S. A nut 79 is received by the threaded stud 77. The bracket 76 has a plurality of apertures 80 spaced along an arc of a circle, the center of which is the center line of the stud 77. A bolt 81 passes through an aperture 82 in the standard S and one of the apertures 80 in the bracket 76 and is threadably received by a nut 83 which is welded to the bracket 76. Each of the other apertures 80 has a nut (not shown) which is in axial alignment therewith and which is welded to the bracket 76. A bracket 76' is welded to the housing 7 and has mounted thereon a threaded stud 77' which receives a nut 79'. The housing 7 therefore is free to be pivoted also with respect to the standard S'. By this construction the vertical inclination of the housing 7, the coating pan 14 and the drive mechanism 60 is able to be changed as a unit. It is, of course, to be understood that when the adjusting mechanism 66 is employed the bolt 81 and the nut 83 are not employed.

In order to dispense a liquid coating medium (not shown) onto the bed 19 of tablets 18, there is provided a dispensing mechanism generally indicated at 85. The dispensing mechanism 85 is shown to include a pair of conduits 86 and 87, the conduit 86 being employed to convey compressed air and the conduit 87 being employed to convey the liquid coating medium to a conventional atomizing device 88. The conduits 86 and 87 pass through a removable closure 89 which is held in position on the cover plate 12 by a fastener 90.

In order to load and unload the tablets 18 from the coating pan 14, there is provided a transparent door 91 which is pivotally mounted by a hinge 92 secured to the cover plate 12. A seal 93 completely surrounds the periphery of the underside of the door 91 so that none of the drying medium can pass out of the housing 7 except through the outlet 8. The door 91 is provided with a handle 94. A detent (not shown) enables the door 91 to be held in the closed position. If desired, the nuts 11 can be loosened and the front portion 10 removed so that the tablets 18 can be loaded or unloaded through the opening 14b of the coating pan 14. Alternatively, the front portion 10 can be hinged in the manner of a door.

A petcock 95 enables the housing 7 to be drained of a suitable solvent which may occasionally be employed to wash the coating pan 14.

In operation, the tablets 18 are loaded through the opening 14a in the coating pan 14 while the door 91 is open. The motor 62 is then adjusted to the desired speed. The housing 7, the coating pan 14 and the drive mechanism 60 are then adjusted as a unit to the desired inclination using either the adjusting mechanism 66 or the adjusting mechanism 75. The flexible ducts 8b and 42 and the flexible conduits 86a and 87a enable the adjustment to be made. In the event the bed 19 of tablets 18 has a rather steep inclination when the coating pan 14 is rotating, the inlet 6 is preferably shifted along a plane generally prependicular to the axis 16 in rotation of the coating pan 14. In this way, the main blast of the drying medium is directed against a relatively small area of the coating pan 14 so that the driving medium will be able to pass through those perforations 15 at the most effective place of contact with the tablets 18. As the coating pan 14 rotates, the dispensing mechanism 85 is rendered operative to dispense an atomized coating medium through the atomizing device 88 onto the bed 19 of tablets 18. Simultaneously, the drying medium, noramlly air, is caused to pass through the ducts 41, 42, 40 and 25 into the inlet manifold 46, through the perforations 15 in the coating pan 14 between the dividers 44 and 45 and through the bed 19 of tablets 18. As the drying medium enters the inlet duct 25 from the small duct 40, the speed of the drying medium is somewhat reduced. Since the drying medium changes direction as it enters the duct 25 a great amount of turbulence is imparted to the drying medium. As the drying medium passes from the inlet manifold 46 into the coating pan 14, a positive pressure is caused to exist within the confines of the coating pan 14, and the spent drying medium will seek to escape through those perforations 15 which open into the outlet manifold 47. Since the outlet manifold 47 opens only into the outlet 8 the spent drying medium must pass through the outlet 8. When the coating operation is completed, the flow of both the drying medium and the coating medium is interrupted and the tablets 18 are unloaded in the reverse manner from which they are loaded.

In accordance with the method of the invention, a plurality of tablets 18 which form the bed 19 are rolled upon each other while a coating medium is dispensed onto the bed 19 of tablets 18 and while a drying medium is passed through the bed 19 of tablets 18.

The above-described embodiment and method being exemplary only, it will be understood that various modifications in form, detail and procedure are within the purview of the invention. Accordingly, the invention is not to be considered as limited save as is consonant with the scope of the following claims.

What is claimed is:

1. In a tablet coating apparatus: a closed housing, a coating drum defining a multiplicity of perforations about substantially the entire periphery thereof, means mounting said drum for rotation within said housing, said coating drum being adapted to contain a bed of tablets, said coating drum being disposed radially inward of said housing, the space between said housing and said coating drum defining a manifold, a pair of spaced means non-fixedly separating said housing and drum and dividing said manifold into an inlet manifold and an outlet manifold, inlet means connected to said housing and providing communication with said inlet manifold, said inlet means leading to a source of drying medium under pressure, outlet means mounted in opposition to said inlet means and connected to said housing for providing communication with said outlet manifold, and means for dispensing a coating medium onto the half of said drum proximate said inlet means whereby said drying medium traverses a closed path from through said inlet means into said inlet manifold, through one end of said coating drum, out the opposing end of said drum to said outlet manifold and through said outlet means.

2. The apparatus defined in claim 1 wherein each of said dividing means comprises: sealing means frictionally engaging opposing faces of said housing and drum.

3. In a tablet coating apparatus: a closed housing, a coating drum defining a multiplicity of perforations about the periphery thereof, means mounting said drum for rotation within said housing, said coating drum being adapted to contain a bed of tablets, said coating drum being disposed radially inward of said housing, the space between said housing and said coating drum defining a manifold, a pair of spaced means non-fixedly separating said housing and drum and dividing said manifold into an inlet manifold and an outlet manifold, means for adjusting the position of at least one of said dividing means to adjust the flow path of the drying medium, inlet means connected to said housing and providing communication with said inlet manifold, said inlet means leading to a source of drying medium under pressure, outlet means spaced in opposition to said inlet means and connected to said housing for providing communication with said outlet manifold, and means for dispensing a coating medium onto the half of said drum proximate said inlet means, whereby said drying medium traverses a closed path through said inlet means into said inlet manifold, through one end of said coating drum, out the opposing end of said drum to said outlet manifold and through said outlet means.

4. The apparatus defined in claim 3 wherein each of said dividing means comprises sealing means frictionally engaging opposing faces of said housing and drum.

5. In a tablet coating apparatus: a closed housing defining a chamber, a coating drum defined a multiplicity of perforations around the periphery thereof, means mounting said drum for rotation within said housing along a generally centrally located axis of rotation, said coating drum being adapted to contain a bed of tablets, means for dispensing a coating medium onto the bed of tablets, inlet means connected to said housing and providing communication with said chamber, means for adjusting said inlet means along a plane generally perpendicular to said axis of rotation, said inlet means leading to a source of drying medium under pressure, and outlet means spaced in opposition to said inlet means and connected to said housing for providing communication with said chamber, whereby said drying medium traverses a closed path through said inlet means through one end of said coating drum to the opposing end of said drum and out said inlet manifold.

6. In a tablet coating apparatus: a closed housing, a coating drum defining a multiplicity of perforations around the periphery thereof, means mounting said drum for rotation in a plane within said housing, said coating drum being adapted to contain a bed of tablets, said coating drum being disposed radially inward of said housing to define a manifold, a pair of spaced channel means for dividing said manifold into an inlet manifold and an outlet manifold, sealing means mounted on said channel means and frictionally engaging opposing faces of said housing and drum, means adjustably mounting one of said channel means, inlet means connected to said housing and providing communication with said inlet manifold, means for rotatably adjusting said inlet means in said plane of rotation, said inlet means leading to a source of drying medium under pressure, outlet means spaced in opposition to said inlet means and connected to said housing for providing communication with said outlet manifold, and means for dispensing a coating medium onto the bed of tablets, whereby said drying medium traverses a closed path through said inlet means into said inlet manifold through said perforations at one end of said coating drum, and through the bed of tablets and the spent drying medium passes through said perforations at the opposite end of said drum into said outlet manifold and through said outlet means.

References Cited

UNITED STATES PATENTS

| | | | |
|---|---|---|---|
| 1,695,362 | 12/1928 | Bourges | 118—303 |
| 2,799,241 | 7/1957 | Wurster | 118—19 |
| 2,860,598 | 11/1958 | Loesche | 118—418 |
| 3,106,492 | 10/1963 | McDonald et al. | 118—20 |
| 2,736,288 | 2/1956 | Clay et al. | 118—19 |
| 2,807,230 | 9/1957 | Brammer | 118—19 |

CHARLES A. WILLMUTH, *Primary Examiner.*

R. D. NEVIUS, *Examiner.*

R. I. SMITH, A. ROSENSTEIN, *Assistant Examiners.*